United States Patent [19]

Prusinski

[11] 4,427,818
[45] Jan. 24, 1984

[54] THERMOPLASTIC POLYMER CONCRETE STRUCTURE AND METHOD

[76] Inventor: Richard C. Prusinski, 7533 Hartwell, Dearborn, Mich. 48126

[21] Appl. No.: 264,038

[22] Filed: May 15, 1981

[51] Int. Cl.³ .......................................... B32B 27/20
[52] U.S. Cl. ........................... 524/442; 52/DIG. 9; 264/DIG. 69; 428/903.3; 524/525
[58] Field of Search ................... 52/DIG. 7, DIG. 9; 428/2; 264/37, DIG. 69; 106/99; 524/8, 442, 525

[56] References Cited

U.S. PATENT DOCUMENTS

| | | | |
|---|---|---|---|
| 2,311,233 | 2/1943 | Jaenicke et al. | 260/37 R |
| 3,640,912 | 2/1972 | Reinhard et al. | 524/8 X |
| 3,645,961 | 2/1972 | Goldfein | 524/8 X |
| 3,712,825 | 1/1973 | Yocum | 428/48 |
| 4,019,919 | 4/1977 | De Salvo | 524/8 X |
| 4,058,406 | 11/1977 | Raponi | 524/8 X |
| 4,160,761 | 7/1979 | Prusinski et al. | 428/150 X |
| 4,169,180 | 9/1979 | McDonagh | 428/215 |
| 4,234,632 | 11/1980 | Lubowitz | 428/2 |
| 4,250,222 | 2/1981 | Mavel et al. | 428/285 |

FOREIGN PATENT DOCUMENTS 1369204 10/1974 United Kingdom ....... 264/DIG. 69

OTHER PUBLICATIONS

The title page, the verso of the title page and pp. 134 and 172 of Webster's Seventh New Collegiate Dictionary G+C Merriam Company, Springfield, Mass.
The title page, the verso of the title page and p. 173 of Hackh's Chemical Dictionary Fourth Edition, McGraw-Hill Book Company New York, etc.

*Primary Examiner*—Henry F. Epstein
*Attorney, Agent, or Firm*—Barnes, Kisselle, Raisch, Choate, Whittemore & Hulbert

[57] ABSTRACT

A thermoplastic polymer concrete block constructed of contaminated thermoplastic resin scrap, previously considered unusable and unrecyclable, and fill material produced by mixing the thermoplastic resin scrap and fill material, heating the mixed thermoplastic resin scrap and fill materials and placing them in molds having a desired shape, wherein they cool and set into the desired product.

4 Claims, 2 Drawing Figures

FIG. 1
FIG. 2
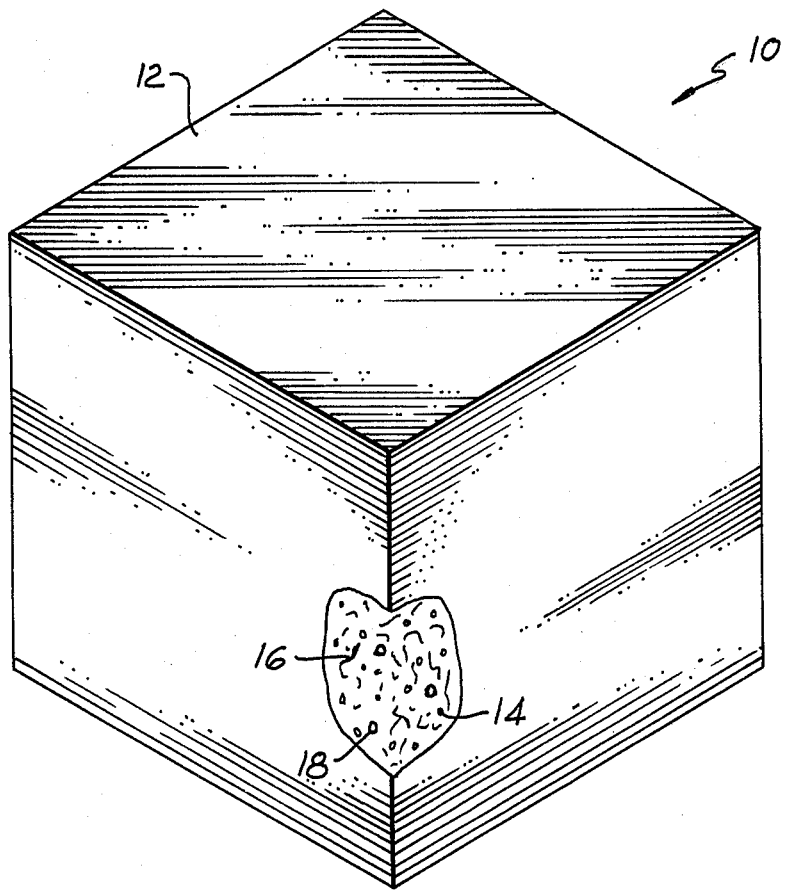
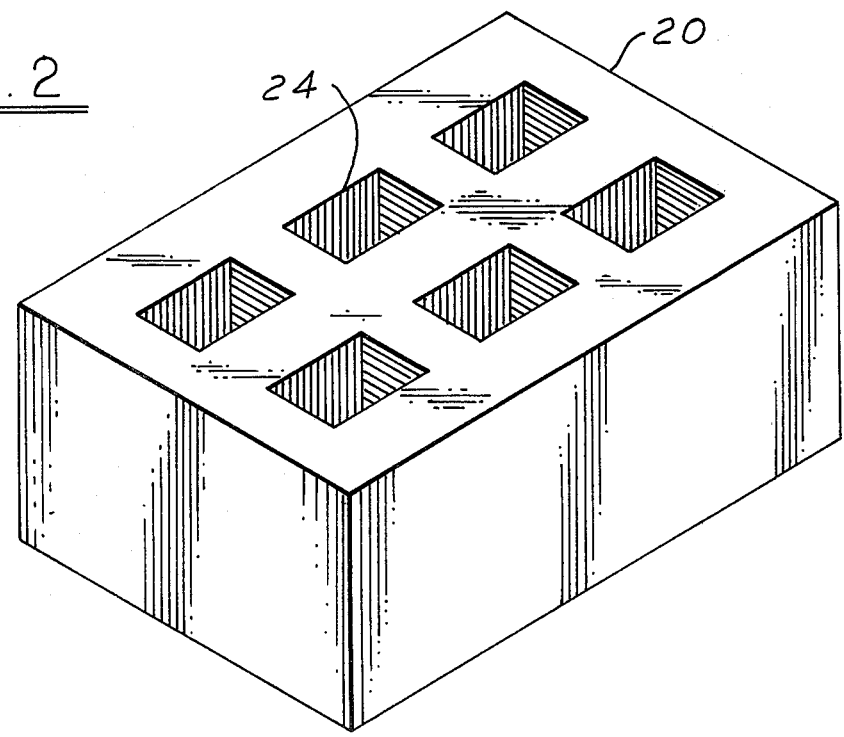

THERMOPLASTIC POLYMER CONCRETE STRUCTURE AND METHOD

BACKGROUND OF THE INVENTION

1. Field of the Invention

The invention relates to a polymer concrete structure and method and refers more specifically to a thermoplastic polymer concrete structure constructed from contaminated, otherwise unusable, unrecyclable scrap plastics, produced by mixing the contaminated scrap plastics with selected fill material, heating the plastics to permit mixing of the fill material with the plastics, and solidifying the mixed plastic and fill material in desired mold forms.

2. Description of the Prior Art

In the past polymer concretes have been known and have had some success as building and flooring materials. The polymer concrete structures of the past, however, have been expensive due to the use of virgin plastics or clean plastic scrap. Both virgin plastic and clean plastic scrap has become particularly expensive so that polymer concrete is currently not being used as widely as it might be if the price were lower.

Further, contaminated plastic scrap has become a disposal problem in many areas. Thus, automobile trim plants and the like have literally tons of plastic scrap contaminated with fiber upholstery, reinforcing metal and the like, which must be disposed of annually and for which there has heretofore been no known commercially feasible recycling structure or method.

Such contaminated plastics, often referred to as "offal" plastics, have long been considered unusable, unrecyclable scrap plastics. Further, other industries have similar unrecyclable waste materials such as contaminated foundry sand. Such waste materials are again a detriment to the ecology and must normally be carefully disposed of at considerable expense to industry.

SUMMARY OF THE INVENTION

In accordance with the invention, contaminated industrial and household scrap thermoplastic materials, previously considered unusable and unrecyclable, are mixed with filler materials, which again may be contaminated and considered unrecyclable, to provide a thermoplastic polymer concrete building material for use as flooring blocks, paving stones, and the like.

In accordance with the method of the invention, the thermoplastic polymer concrete of the invention is produced by heating the contaminated scrap thermoplastic material, mixing the heated thermoplastic material with fillers therefor, and cooling the mixed scrap plastic and fillers in molds of desired size and shape.

BRIEF DESCRIPTION OF THE DRAWING

FIG. 1 is a perspective view of a building block constructed of the thermoplastic polymer concrete of the invention by the method of the invention.

FIG. 2 is a perspective view of a second embodiment of the building block of the invention.

DESCRIPTION OF THE PREFERRED EMBODIMENT

The thermoplastic polymer concrete building block 10 shown in the figure includes a matrix 12 of thermoplastic resin surrounding a plurality of fill material such as sand particles 14, fibrous particles 16 such as threads, and other larger solid waste materials 18 such as metal chips.

The composition of the thermoplastic polymer concrete block 10 may be varied depending on the desired characteristics of the product and the mode for accommodating the workability of the various plastics utilized in the concrete.

The sources of scrap materials which may be utilized for the block 10 are many, so that the scrap materials are generally available. In particular, the plastics utilized are contaminated industrial, household or other waste, thermoplastic resins otherwise considered unusable, unrecyclable scrap plastics because of contaminants therein such as metal particles, fibrous portions of upholstery, etc.

Similarly, the fill materials other than the contaminants contained with the thermoplastic resins may themselves be contaminated and therefore considered unrecyclable and undesirable, such as foundry sand utilized with certain additives so as to be generally unrecyclable in the foundry process. Other fill materials, by way of example not intended to be limited are, silica flower, finely ground silica, talc, marble dust, etc.

One example of the composition of the block 10 constructed from contaminated waste products may be 25% ABS plastic, 25% foundry sand, 25% low density polyethylene and 25% high density polyethylene.

Another example of the composition of the block 10 is 33% ABS plastic, 33% foundry sand and 33% polyethylene.

These percentages are not necessarily exact and vary slightly with the type of plastic scrap and filler used. The blocks 10 find use in such diverse applications as industrial floor block, street paving stones, patio stones, sewage run-off culverts, railroad ties, radiation shielding, drainage troughs, etc.

Further, one or both of the plastic scrap and filler therefor may be required to have chemical resistance to oil and products of oil, or to acid solutions or alkaline solutions in different applications.

Also, one or both of the plastic scrap and fillers may be required to have wear resistance to abrasion, gouging and scraping, heavy blows of metallic objects, continuous heavy traffic by heavy equipment, and skid or slip resistance for pedestrian or worker walking safety, or to vehicular traffic including vehicles having metal track or wheels.

The particular physical characteristics of the block 10 may be controlled by the type of scrap plastic and filler used and plastics may be utilized other than polyethylene to provide various physical properties for the block 10.

Thus, methacrylates as well as polyethylene and phenolics may be utilized as either the plastic material or the fill.

Further, the fill, which may be contaminated, for the plastic scrap may be metals, cloth covers, paper, woods, and other scrap material found in the home or factory.

Contaminants, while generally considered unacceptable in the scrap plastic and/or fillers utilized in the block 10, in fact enhance the properties of the block 10.

Thus, in optimum mixtures such as pointed out above, the strength of the plastic block is improved over either plastic or filler material by itself and the expansion coefficients may be altered, as well as the burning time and flow characteristics. The compressive, tensile, flexural and shear qualities of the block may also be improved in direct proportion to optimum fill of the thermoplastic matrix with inert particles.

Sand of course has an attribute of adding an abrasive quality to the surface of the block for use in conjunction with pedestrian or vehicular traffic. Fibrous contaminants also have a reinforcing purpose analogous to a fiber glass reinforced plastic or the like.

Clear plastic scrap has the particular advantage of being easy to pigment to provide desired color to the block 10.

The method of producing the block 10 includes mixing the contaminated otherwise unusable, unrecyclable thermoplastic scraps with fill material such as fiber 16, sand 14, metal particles 18, and the like, heating the mixture to soften the plastic scrap so that it forms a matrix around the fill material, and cooling the mixed plastic scrap and fill material in molds of desired size to produce the block 10.

The block structure 10 and the method of producing the block from "offal" plastic, otherwise considered unusable, unrecyclable scrap plastics, thus produces not only a particularly desirable product but also becomes extremely significant, since the block 10 utilizes the scrap and offal plastic which now constitutes a hazard to public safety and environmental pollution and contamination as defined in Public Law #94-580, dated Oct. 1, 1976, entitled "Resource Conservation and Recovery Act", as it relates to disposal of nonbiodegradable materials.

Other than the present polymer concrete, it is believed that no serious effort to reclaim "offal" plastic scrap other than pyrolysis or energy recovery by burning methodologies has been pursued on a commercial product development basis. Thus, the utilization of this unwanted scrap presents an untapped resource of unlimited and ever-increasing magnitude.

While one embodiment of the present invention has been considered in detail, it will be understood that other embodiments and modifications of the invention are contemplated.

It is therefore the intention to include all such embodiments and modifications of the invention as are defined by the appended claims within the scope of the invention.

Thus it will be understood that reprocessed plastic scrap, not just "offal" plastic may be used to produce the block 10. Also the "offal" plastic may be reprocessed before being used in block 10.

Further, as shown in FIG. 2 the building block of the invention constructed of the same material may take different embodiments. The building block 20 shown in FIG. 2 is generally rectangular and has openings 24 therein to promote rapid cooling, fewer cracks and less expense in larger blocks.

I claim:

1. A polymer structure comprising a mixture of pre-contaminated otherwise unusable, unrecyclable, thermoplastic, offal, scrap plastic, resins and fillers therefor having the approximate composition of 25% ABS, 25% sand, 25% low density polyethylene and 25% high density polyethylene by weight, which polymer structure results from heating the resins, mixing the fillers therein and allowing the mixture to cool in a mold form.

2. A polymer structure comprising a mixture of pre-contaminated thermoplastic resins and fillers therefor having the approximate composition of 25% ABS, 25% sand, 25% low density polyethylene and 25% high density polyethylene by weight, resulting from heating the precontaminated resins, mixing the fillers therein, and allowing the mixture to cool in a mold form.

3. A polymer structure comprising a mixture of pre-contaminated thermoplastic resins and fillers therefor having the approximate composition of 33% ABS, 33% sand, and 33% polyethylene by weight, resulting from heating the precontaminated resins, mixing the fillers therein, and allowing the mixture to cool in a mold form.

4. A polymer structure comprising a mixture of pre-contaminated thermoplastic resins, which are otherwise unusable, unrecyclable scrap plastics and fillers therefor having the approximate composition of 33% ABS, 33% sand, and 33% polyethylene by weight, resulting from heating the precontaminated resins, mixing the fillers therein, and allowing the mixture to cool in a mold form.

* * * * *